US012804464B2

United States Patent

(12) United States Patent (10) Patent No.: US 12,804,464 B2

Yang et al.

(45) Date of Patent: Nov. 17, 2026

(54) METHOD FOR RELAY TRANSMISSION, RELAY USER EQUIPMENT, AND REMOTE USER EQUIPMENT

(71) Applicant: GUANGDONG OPPO MOBILE TELECOMMUNICATIONS CORP., LTD., Dongguan (CN)

(72) Inventors: Haorui Yang, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1118 days.

(21) Appl. No.: 17/728,445

(22) Filed: Apr. 25, 2022

(65) Prior Publication Data

US 2022/0248268 A1 Aug. 4, 2022

Related U.S. Application Data

(63) Continuation of application No. PCT/CN2020/109801, filed on Aug. 18, 2020.

(51) Int. Cl.

*H04W 28/08* (2023.01)

*H04W 88/06* (2009.01)

(52) U.S. Cl.

CPC ........ *H04W 28/0908* (2020.05); *H04W 88/06* (2013.01)

(58) Field of Classification Search

CPC .......................... H04W 28/0908; H04W 88/06

USPC .......................................................... 370/235

See application file for complete search history.

(56) References Cited

U.S. PATENT DOCUMENTS

| | | | | |
|---|---|---|---|---|
| 10,568,090 B2 | 2/2020 | An et al. | | |
| 2012/0316687 A1 | 12/2012 | Chen et al. | | |
| 2018/0139694 A1* | 5/2018 | Folke | .................... | H04W 76/14 |
| 2019/0215759 A1* | 7/2019 | Wei | ........................ | H04W 74/00 |
| 2019/0394816 A1* | 12/2019 | Kim | ...................... | H04W 76/10 |
| 2020/0178343 A1 | 6/2020 | Kim et al. | | |

FOREIGN PATENT DOCUMENTS

| | | |
|---|---|---|
| CN | 107211297 A | 9/2017 |
| CN | 108347737 A | 7/2018 |
| CN | 109479189 A | 3/2019 |
| WO | 2016073984 A2 | 5/2016 |

(Continued)

OTHER PUBLICATIONS

Extended European Search Report for EP Application 20949767.6 mailed Oct. 31, 2022. (14 pages).

(Continued)

*Primary Examiner* — Chi Tang P Cheng

(74) *Attorney, Agent, or Firm* — Young Basile Hanlon & MacFarlane, P.C.

(57) ABSTRACT

Methods for relay transmission, a relay user equipment (UE), and a remote UE are provided in implementations of the disclosure. The method includes the following. A relay UE receives a first message transmitted by a network device, where the first message contains information of a back-off (BO) timer, and the BO timer is used for congestion control. During running of the BO timer, the relay UE is restrained from performing a relay service for a remote UE.

20 Claims, 8 Drawing Sheets

(56) References Cited

FOREIGN PATENT DOCUMENTS

WO 2019216526 A1 11/2019

OTHER PUBLICATIONS

3GPP TS 23.501 V16.5.1 (Aug. 2020); Technical Specification Group Services and System Aspects; System architecture for the 5G System (5GS); Stage 2; Release 16. (440 pages).

Interdigital, KI #3, Sol #7: Update to clarify Congestion Control, SA WG2 Meeting #140e, S2-2005811, Aug. 19-Sep. 1, 2020. (8 pages).

3GPP TS 24.501 V16.5.0 (Jun. 2020); Technical Specification 3rd Generation Partnership Project; Technical Specification Group Core Network and Terminals; Non-Access-Stratum (NAS) protocol for 5G System (5GS); Stage 3; (Release 16) dated Jul. 13, 2020.

International search report with English Translation issued in corresponding application PCT/CN2020/109801 dated Apr. 29, 2021.

Communication pursuant to Article 94(3) EPC for EP Application 20949767.6 mailed Jul. 3, 2023. (12 pages).

Chinese First Office Action with English Translation for CN Application 2022106313589 mailed Jul. 8, 2023. (15 pages).

* cited by examiner

METHOD FOR RELAY TRANSMISSION, RELAY USER EQUIPMENT, AND REMOTE USER EQUIPMENT

CROSS-REFERENCE TO RELATED APPLICATION(S)

This application is a continuation of International Application No. PCT/CN2020/109801, filed on Aug. 18, 2020, the entire disclosure of which is hereby incorporated by reference.

TECHNICAL FIELD

Implementations of the disclosure relate to the field of communication, and in particular to methods for relay transmission, a relay user equipment (UE), and a remote UE.

BACKGROUND

In a new radio (NR) system, a terminal device with a proximity services (ProSe) function can directly communicate with another terminal device with the ProSe function through a PC5 interface. When a terminal device not only can connect with an external data network through the $5^{th}$ generation (5G) network but also has the ProSe function, the terminal device can be assigned as a relay user equipment (UE). Another remote UE with the ProSe function can establish direct connection with the relay UE through the PC5 interface, and interact with the external network through a protocol data unit (PDU) session that is established by the relay UE and the 5G network.

In some scenarios, the network may be congested. For protecting the network, a congestion control mechanism is introduced. If the relay UE receives a congestion control notice of the network, the relay UE cannot perform relay data transmission. In this case, since the remote UE does not know that the relay UE cannot perform relay data transmission, the remote UE still may transmit data to the relay UE, resulting in failure of data transmission, thereby affecting user experience.

SUMMARY

Methods for relay transmission, a relay user equipment (UE), and a remote UE are provided in implementations of the disclosure.

According to a first aspect, a method for relay transmission is provided. The method includes the following. A relay UE receives a first message transmitted by a network device, where the first message contains information of a back-off (BO) timer, and the BO timer is used for congestion control. During running of the BO timer, the relay UE is restrained from performing a relay service for a remote UE.

According to a second aspect, a method for relay transmission is provided. The method includes the following. A remote UE receives information of a BO timer transmitted by a relay UE.

According to a third aspect, a relay UE is provided. The relay UE includes a transceiver, a memory storing a computer program, and a processor coupled with the transceiver and the memory. The computer program is executed by the processor to cause the relay UE to receive a first message transmitted by a network device, and restrain from performing a relay service for a remote UE during running of the BO timer, where the first message contains information of a BO timer, and the BO timer is used for congestion control.

According to a fourth aspect, a remote UE is provided. The remote UE includes a transceiver, a memory storing a computer program, and a processor coupled with the transceiver and the memory. The computer program is executed by the processor to cause the remote UE to receive information of a BO timer transmitted by a relay UE.

DETAILED DESCRIPTION

The following will illustrate technical solutions of implementations of the disclosure with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applied to these communication systems.

Alternatively, a communication system in implementations of the disclosure can be applicable to a carrier aggregation (CA) scenario, a dual connectivity (DC) scenario, and a standalone (SA) scenario.

A spectrum applied is not limited in implementations of the disclosure. For example, implementations of the disclosure can be applied to a licensed spectrum and also can be applied to an unlicensed spectrum.

Figure 1:
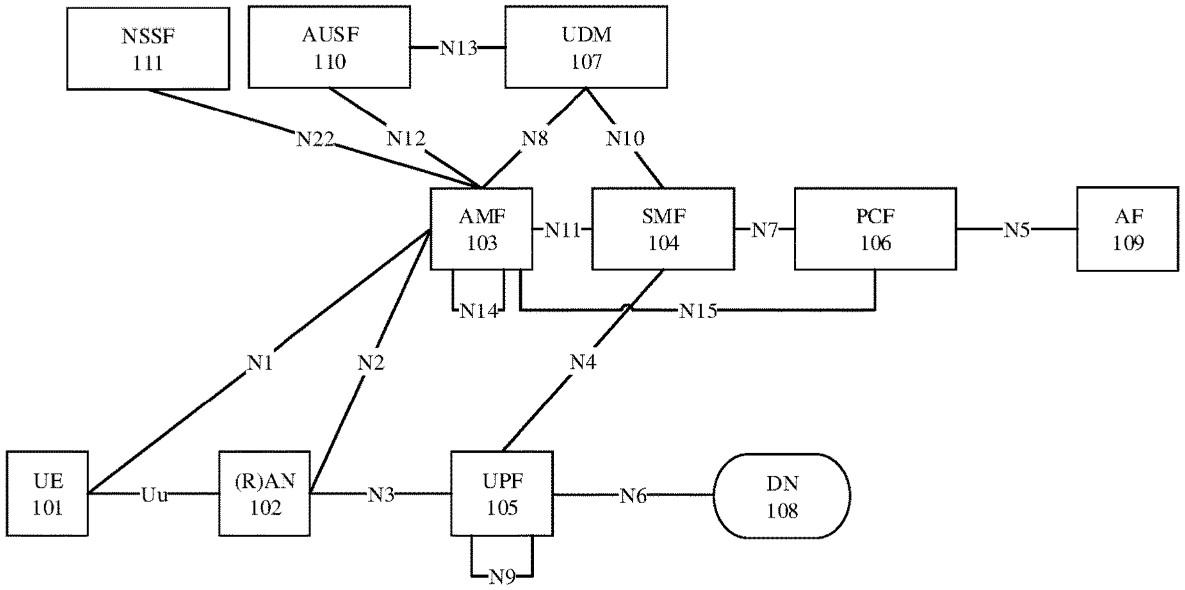
FIG. 1 is a schematic diagram illustrating a communication system architecture provided in implementations of the disclosure.

FIG. 1 is a schematic diagram exemplarily illustrating a communication system 100 applied in the disclosure. As illustrated in FIG. 1, the communication system 100 mainly includes a user equipment (UE) 101, an access network (AN) device 102, an access and mobility management function (AMF) entity 103, a session management function (SMF) entity 104, a user plane function (UPF) entity 105, a policy control function (PCF) entity 106, a unified data management (UDM) entity 107, a data network (DN) 108, an application function (AF) entity 109, an authentication server function (AUSF) entity 110, and a network slice selection function (NSSF) entity 111.

Specifically, in the communication system 100, the UE 101 performs access stratum (AS) connection with the AN device 102 through a Uu interface to interact with an AS message and wireless data transmission, and the UE 101 performs non-access stratum (NAS) connection with the AMF entity 103 through an N1 interface to interact with an NAS message. The AN device 102 is connected with the AMF entity 103 through an N2 interface, and the AN device 102 is connected with the UPF entity 105 through an N3 interface. Multiple UPF entities 105 are connected mutually through an N9 interface, the UPF entity 105 is connected with the DN 108 through an N6 interface, and the UPF entity 105 is connected with the SMF entity 104 through an N4 interface. The SMF entity 104 is connected with the PCF entity 106 through an N7 interface, the SMF entity 104 is connected with the UDM entity 107 through an N10 interface, the SMF entity 104 controls the UPF entity 105 through the N4 interface, and the SMF entity 104 is connected with the AMF entity 103 through an N11 interface. Multiple AMF entities 103 are connected mutually through an N14 interface, the AMF entity 103 is connected with the UDM entity 107 through an N8 interface, the AMF entity 103 is connected with the AUSF entity 110 through an N12 interface, the AMF entity 103 is connected with the NSSF entity 111 through an N22 interface, and the AMF entity 103 is connected with the PCF entity 106 through an N15 interface. The PCF entity 106 is connected with the AF entity 109 through an N5 interface. The AUSF entity 110 is connected with the UDM entity 107 through an N13 interface.

In the communication system 100, the UDM entity 107 is a subscription database in a core network to store user subscription data in the 5th generation (5G) network. The AMF entity 103 plays a mobility management function in the core network, and the SMF entity 104 plays a session management function in the core network. The AMF entity 103 not only performs mobility management on the UE 101 but also forwards a message related to session management between the UE 101 and the SMF entity 104. The PCF entity 106 plays a policy management function in the core network and is responsible for formulating policies of mobility management, session management, charging, or the like for the UE 101. The UPF entity 105 plays a user plane function in the core network, performs data transmission with an external data network through the N6 interface, and performs data transmission with the AN device 102 through the N3 interface. After the UE 101 accesses the 5G network through the Uu interface, the UE 101 establishes protocol data unit (PDU) session data connection from the UE 101 to the UPF entity 105 under control of the SMF entity 104, to perform data transmission. The AMF entity 103 and the SMF entity 104 obtain the user subscription data from the UDM entity 107 respectively through the N8 interface and the N10 interface, and policy data from the PCF entity 106 respectively through the N15 interface and the N7 interface In addition, the communication system 100 further includes a network exposure function (NEF) entity, where the NEF entity is used to perform information transmission between a core network node and a third-party application through a server interface of the third-party application.

It can be understood that, devices with a communication function can be collectively called communication devices in the network/system in implementations of the disclosure.

It to be noted that, a 5G communication system is taken as an example of the communication system 100 for illustration. Of course, the disclosure can be also applicable to other third generation partnership project (3GPP) communication systems, e.g., a 4th generation (4G) communication system or a future 3GPP communication system, which will not be limited herein.

It can be understood that, the terms "system" and "network" in this disclosure are often used interchangeably. The term "and/or" in this disclosure is simply an illustration of an association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

In implementations of the disclosure, each implementation is illustrated in conjunction with a terminal device and a network device, where the terminal device also may be called as a UE, an access terminal, a subscriber unit, a subscriber station, a mobile station, a mobile platform, a remote station, a remote terminal, a mobile device, a user terminal, a terminal, a wireless communication device, a user agent, a user apparatus, or the like. The terminal device also may be a station (ST) in the WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, or a next-generation communication system, e.g., a terminal device in the NR network, a terminal device in a future evolved public land mobile network (PLMN), or the like.

As an example but not limitation, in implementations of the disclosure, the terminal device also may be a wearable device. The wearable device also can be called as a wearable smart device, which is a collective name of wearable devices intelligently designed and developed by applying a wearable technology to daily wear, such as glasses, gloves, watches, clothing, shoes, or the like. The wearable device is a portable device that is worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and cannot rely on a smart phone to realize all or part of functions, e.g., a smart watch, smart glasses, or the like, and a device that only focuses on a certain application function and needs to be used with other devices such as a smart phone, e.g., all kinds of smart bracelets for physical sign monitoring, smart jewelry, or the like.

The AN device 102 may be a device that is used to communicate with a mobile device. The AN device 102 may be an access point (AP) in the WLAN, a base transceiver station (BTS) in the GSM or CDMA system, a NodeB (NB) in the WCDMA system, or an evolved NodeB (eNB or eNodeB) in the LTE system. Alternatively, the AN device 102 also may be a relay station, an AP, an in-vehicle device, a wearable device, a generation NodeB (gNB) in the NR network, or a network device in the future evolved PLMN.

In implementations of the disclosure, the network device provides a service to a cell, and the terminal device communicates with the network device through a transmission resource (e.g., a frequency-domain resource or a spectrum resource) used by the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage range and low transmission power and are applicable to provide a high-speed data transmission service.

Figure 2:
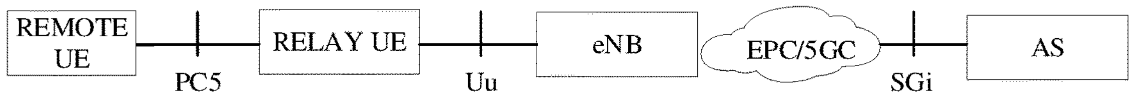
FIG. 2 is a schematic diagram illustrating a relay communication system architecture provided in implementations of the disclosure.

In implementations of the disclosure, a terminal device with a proximity service (ProSe) function can directly communicate with another terminal device with the ProSe function through a PC5 interface. When a terminal device not only can connect the external data network through the LTE or 5G network but also has the ProSe function, the terminal device can be assigned as a relay user equipment (UE). Another remote UE with the ProSe function can establish direct connection with the relay UE through the PC5 interface, and interact with the external network through a PDU session that is established by the relay UE and the LTE or 5G network. A system architecture is illustrated in FIG. 2. As illustrated in FIG. 2, the remote UE is connected to the relay UE through the PC5 interface, the relay UE is connected to a radio access network (RAN), e.g., an eNB or a next generation evolutional radio access network (NG-RAN)) through the Uu interface, and then connected to an evolved packet core (EPC) or a 5G core network (5GC), where the EPC/5GC is connected to an application server (AS) through a service gateway interface (SGI).

It to be noted that, an LTE communication system and a 5G communication system are taken as an example for illustration in FIG. 2, and the system architecture in FIG. 2 can also be applied to other 3GPP communication systems, e.g., a future 3GPP communication system, which will not be limited herein. In addition, in implementations of the disclosure, the AS in FIG. 2 also may be other terminal devices or an external public security network.

In the 5G system, a UE-to-network relay architecture may include two possible manners: a layer-3 (L3) architecture and a layer-2 (L2) architecture. A main difference between the L3 architecture and the L2 architecture is as follows.

Under the L3 architecture, the remote UE does not need to be registered with the network but transmits data through the relay UE.

Under the L2 architecture, the remote UE is similar to a normal UE and needs to perform a needed process (e.g., registration and session establishment), and data and signaling under the L2 architecture are transmitted to the base station through the relay UE.

Figure 3:
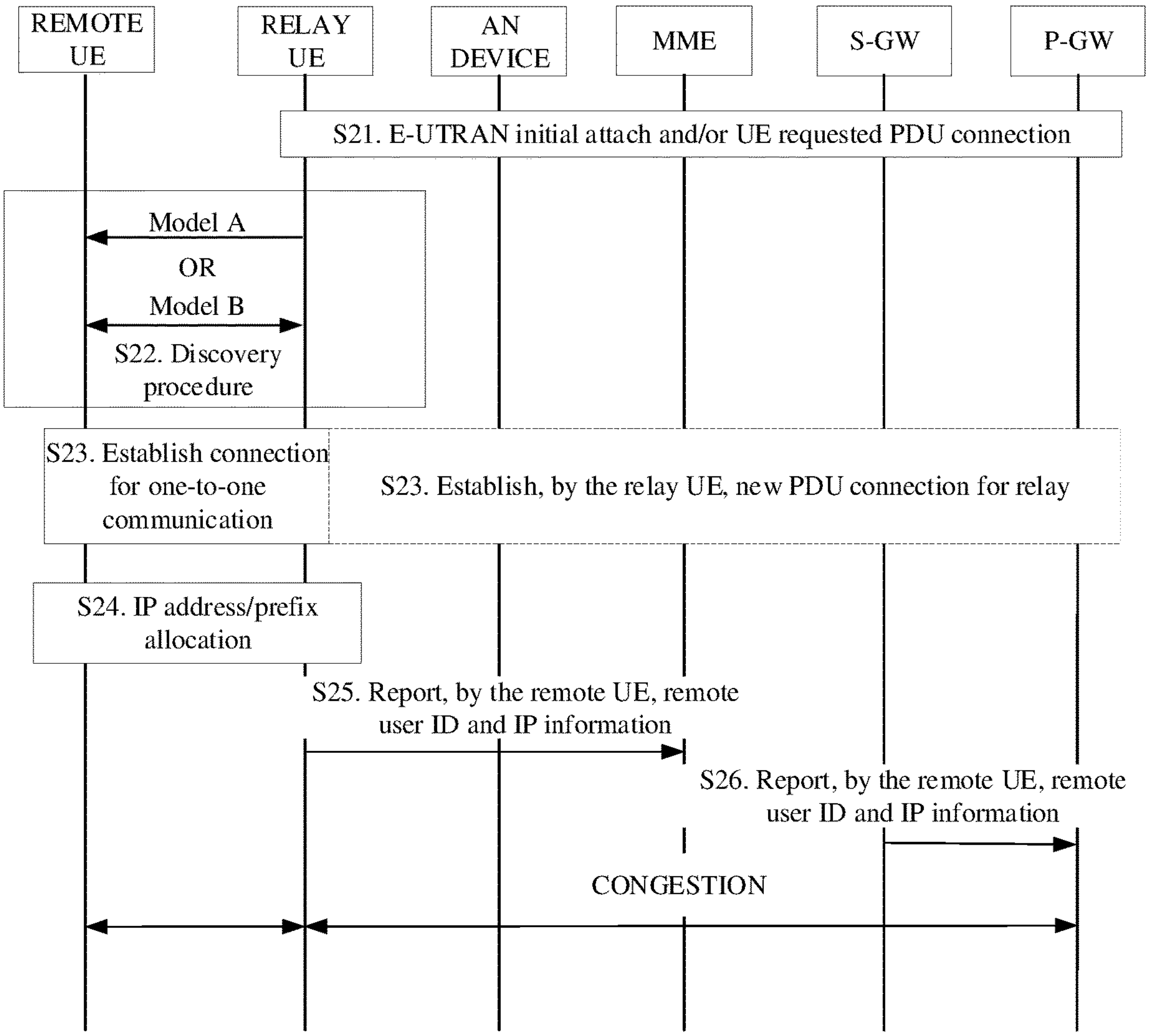
FIG. 3 is a schematic flow chart illustrating relay transmission.

As illustrated in S23 of FIG. 3, for transmitting relay data of the remote UE, the relay UE needs to use a suitable PDU connection. The relay UE decides to use which PDU connection to transmit the relay data. For example, the relay UE can use a dedicated PDU connection to transmit all relay data.

For example, in specific transmission, a transmission path of uplink (UL) data may be: remote UE→relay UE→RAN→5GC→data network name (DNN)→AS. A transmission path of downlink (DL) data is reversed.

Figure 4:
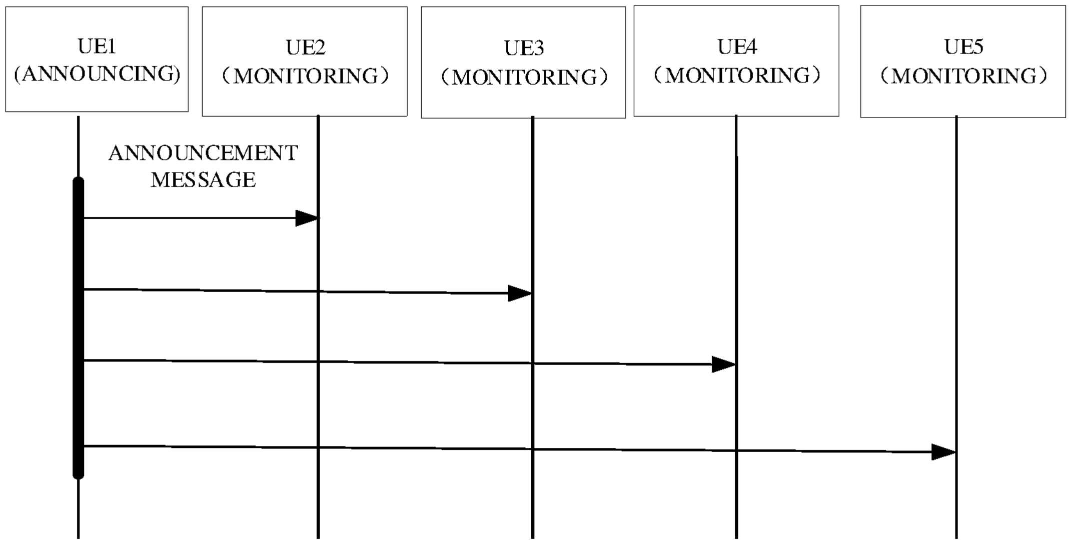
FIG. 4 is a schematic diagram illustrating a process of relay discovering according to implementations of the disclosure.

The remote UE and the relay UE need to perform a discovery procedure before establishing connection. The discovery procedure can use model A or model B. FIG. 4 illustrates an example of model A discovery procedure, and FIG. 5 illustrates an example of model B discovery procedure.

As illustrated in FIG. 4, UE1 can be assigned as the relay UE. UE1 transmits an announcement message, also called an announcement message for discovering, to inform the remote UE. A UE that receives the announcement message for discovering can establish connection with UE1 when a relay service is needed, to transmit relay data through UE1.

Figure 5:
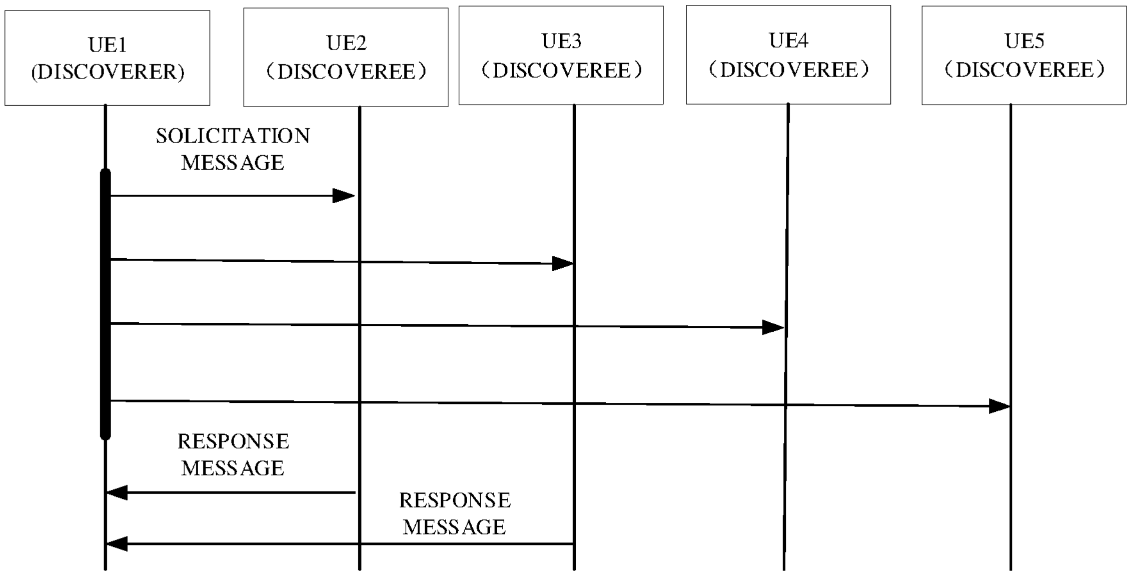
FIG. 5 is a schematic diagram illustrating another process of relay discovering according to implementations of the disclosure.

As illustrated in FIG. 5, UE1 can be assigned as the remote UE. If UE1 wants to search the relay UE, UE1 can transmit a solicitation message, also called a solicitation message for discovering, to inform the relay UE. A UE that receives the solicitation message for discovering can reply to a response message for discovering to UE1 when the UE can perform relay service, to inform UE1 that the UE can perform relay service.

In some scenarios, the network may be congested. For protecting the network, a congestion control mechanism is introduced, where the congestion control mechanism can include a congestion control mechanism at a core network side and a congestion control mechanism at an AN side.

1. The congestion control mechanism at the core network side

The congestion control mechanism at the core network side can generally include three categories: NAS level mobility management congestion control, DNN based congestion control (further including mobility management (MM) and session management (SM)), and single-network slice selection assistance information (S-NSSAI) based congestion control (further including MM and SM).

In some implementations, the core network can perform congestion control by rejecting a request of the UE and carrying a congestion cause and a back-off (BO) timer.

1.1. For NAS level mobility management congestion control, the core network can perform congestion control through registration reject, service reject, a deregistration request, or other messages. In the above scenario, the UE under congestion control cannot perform data transmission.

1.2. For MM DNN based congestion control and MM S-NSSAI based congestion control, the core network can carry the BO timer through DL NAS transport.

In the two scenarios, for a condition that no PDU session is established, data transmission cannot be performed, and for a condition that a PDU session is established, there may be no congestion control at an MM level.

1.3. For MM DNN based congestion control and MM S-NSSAI based congestion control, DNN based congestion control can be associated with DNN, no DNN, and both DNN and S-NSSAI, and S-NSSAI based congestion control can be associated with S-NSSAI, no S-NSSAI, and both DNN and S-NSSAI.

If PDU session establishment on DNN or S-NSSAI of congestion control is rejected, data transmission cannot be performed. If PDU session modification on DNN or S-NSSAI of congestion control is rejected, there is no effect on data transmission.

2. The congestion control mechanism at the AN side is that the base station rejects or releases radio resource control (RRC) connection of the UE, e.g., the base station makes an RRC release message carry a wait time. The UE cannot initiate RRC connection establishment before expiration of the wait time.

In some situations, if the relay UE receives a congestion control notice of the network, the relay UE cannot perform relay data transmission. In this case, since the remote UE does not know that the relay UE cannot perform relay data transmission, the remote UE may still transmit data to the relay UE, resulting in failure of data transmission, thereby affecting user experience. Therefore, how to perform relay transmission under congestion control is an urgent problem to be solved.

It can be understood that, the above mechanisms also can be applicable to other scenarios besides congestion control, e.g., to normalize a time interval every which the relay UE initiates a retransmission process, i.e., the relay UE is restrained from initiating frequently a same process within an extremely short time interval.

Figure 6:
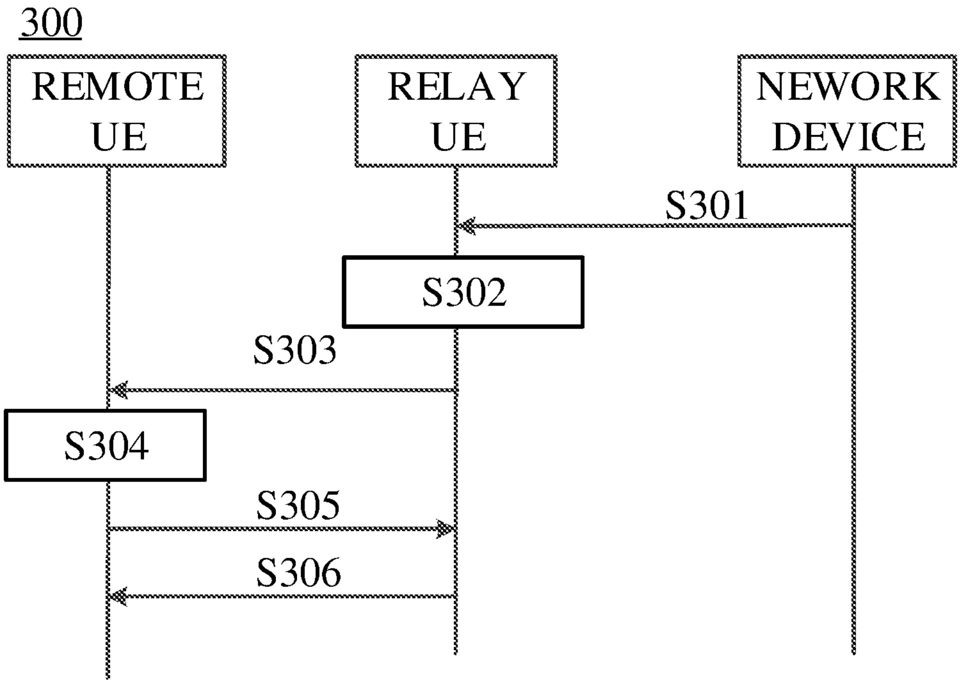
FIG. 6 is a schematic flow chart illustrating a method for relay transmission provided in implementations of the disclosure.

FIG. 6 is a schematic interactive diagram illustrating a method 300 for relay transmission according to implementations of the disclosure. As illustrated in FIG. 6, the method 300 may include but is not limited to the following.

At S301, a network device transmits a first message to a relay UE, where the first message contains information of a BO timer.

Correspondingly, the relay UE receives the first message transmitted by the network device.

In implementations of the disclosure, if the relay UE receives the information of the BO timer from the network device, the relay UE determines that a relay service on the relay UE is constrained within a duration of the BO timer. Optionally, the relay service on the relay UE being constrained may include that the relay UE cannot perform the relay service during running of the BO timer, and/or the relay UE cannot perform a relay service on a specific target during running of the BO timer.

In some implementations, the BO timer may be a BO timer in a congestion control scenario.

The congestion control scenario may be any congestion control scenario in the foregoing implementations, e.g., the congestion control scenario at the core network or the congestion control scenario at the AN, where the congestion control scenario at the core network for example may include NAS level mobility management congestion control, DNN based congestion control, S-NSSAI based congestion control, or the like.

In other implementations, the BO timer also may be used to normalize the time interval every which the relay UE initiates the retransmission process, i.e., the relay UE is restrained from initiating frequently the same process within an extremely short time interval. In a sense, by restricting the relay UE from initiating frequently the same process, network congestion can be avoided. The following takes that the BO timer is used in the congestion control scenario as an example for illustration, which will not be limited herein.

It can be understood that, the UE-to-network relay architecture is not specifically limited in implementations of the disclosure, e.g., the UE-to-network relay architecture may be the L3 architecture or the L2 architecture in the foregoing implementations.

Optionally, the first message may be any DL message, e.g., the information of the BO timer can be carried in an existing message or a new message.

In some implementations, the network device is a core network device, and the first message includes one of: a registration reject message, a service reject message, a deregistration message, DL NAS transport, a session establishment reject message, or a session modification reject message.

In other implementations, the network device is an AN device, and the first message is an RRC message.

Optionally, in some implementations, the network device also can transmit the information of the BO timer to the remote UE, e.g., the remote UE can be registered with the network in the L2 architecture. In this case, the network device can know existence of the remote UE, and when the network device transmits the information of the BO timer to the relay UE, the network device also can transmit the information of the BO timer to the remote UE that is connected with the relay UE, i.e., inform two parties of the relay service.

In conjunction with implementation 1 and implementation 2, the following will illustrate processing manners of the relay UE in the case where the relay UE receives the information of the BO timer.

Implementation 1

At S302, during running of the BO timer, the relay UE is restrained from transmitting a message used for device discovering or transmits a second message, where the second message is used to indicate that a relay service on the relay UE is constrained or the relay UE cannot be used as a relay.

In some implementations, the relay UE is restrained from transmitting the message used for device discovering may include that the relay UE does not actively transmit the message used for device discovering, e.g., the relay UE may be restrained from transmitting an announcement message used for discovering in model A as illustrated in FIG. 4.

In some implementations, the relay UE being restrained from transmitting the message used for device discovering may include that the relay UE does not respond (or reply) to a message that is used to discover the relay UE transmitted by the remote UE, e.g., the relay UE may be restrained from transmitting a response message for discovering in model B as illustrated in FIG. 5.

In this case, for the remote UE, it is equivalent to that the remote UE does not know that the relay UE can be assigned as the relay, and may not establish connection with the relay UE, thereby avoiding failure of relay transmission, and the remote UE can select another relay UE more suitable to transmit relay data, thereby avoiding interruption of the relay service on the remote UE.

In other implementations, the relay UE can transmit a second message containing a specific content to the remote UE, where the second message is used to indicate that a relay service on the relay UE is constrained or the relay UE cannot be used as a relay.

Optionally, the relay service on the relay UE being constrained may include that the relay UE cannot perform the relay service during running of the BO timer, and/or the relay UE cannot perform a relay service on a specific target during running of the BO timer.

In some scenarios, for example, for NAS level congestion control, the relay service on the relay UE being constrained may refer to that the relay UE cannot perform the relay service.

In other scenarios, for example, for DNN based congestion control or S-NSSAI based congestion control, the relay service on the relay UE being constrained may refer to that the relay UE cannot perform the relay service on the specific target, e.g., a specific DNN, specific S-NSSAI, or the like.

As an example, the second message contains no identifier (ID) of a target associated with the BO timer. In this case, when a relay service on the target needs to be performed, the remote UE may not select the relay UE to perform the relay service, thereby avoiding failure of transmission of this type of services.

It can be understood that, the target associated with the BO timer may refer to a target that needs to be backed off, i.e., the relay service on the target is constrained during running of the BO timer.

As another example, the second message contains the information of the BO timer and the ID of the target associated with the BO timer.

In this case, according to the second message, the remote UE can determine that the relay UE cannot perform the relay service on the target within the duration of the BO timer. In this case, on condition that the remote UE needs to perform the relay service on the target, the remote UE can select to wait for expiration of the BO timer and then perform the relay service on the target through the relay UE, or access another relay UE to perform the relay service on the target.

As a yet another example, the second message contains no parameter for relay transmission.

That is, the relay UE can select not to provide the relay service, as such even if the remote UE knows that the relay UE can perform the relay service, the remote UE does not select the relay UE to perform the relay service, thereby avoiding failure of relay transmission during running of the BO timer.

In some scenarios, the relay UE provides not only the relay service but also other services between UEs, e.g., a PC5 service, in this case, the relay UE can transmit a message that contains no relay-related parameter, i.e., the relay UE stops to provide the relay service but still provides other services.

In some implementations, the second message is an announcement message for discovering or a response message for discovering.

Optionally, in some implementations, the ID of the target includes at least one of: a DNN, S-NSSAI, or a relay service code.

In some implementations, the relay service code can correspond to at least one DNN and/or at least one S-NSSAI.

The remote UE can know a DNN and/or S-NSSAI that need to be backed off, according to the ID of the target.

In some implementations, a mapping relation between the relay service code and the DNN and/or the S-NSSAI can be configured for the terminal device by the network device, or be pre-configured on the terminal device, where the terminal device can include the remote UE and the relay UE.

In some implementations, the network device is an AN device, e.g., a base station, i.e., the information of the BO timer may be configured by the base station. In this case, the first message may be transmitted by an RRC layer of the base station, and after an RRC layer of the relay UE receives the first message, the RRC layer of the relay UE can further transmit the information of the BO timer to a specific layer of the relay UE, e.g., an NAS layer, or a layer of the relay UE responsible for discovering a service, e.g., a ProSe layer. Furthermore, the specific layer of the relay UE can perform related operations at S302.

Therefore, in the method for relay transmission in implementations of the disclosure, in the case where the relay UE receives the information of the BO timer of the network, the relay UE may be restrained from transmitting the message for device discovering or inform the remote UE that the relay service on the relay UE is constrained or the relay UE cannot be used as the relay. As such, the remote UE can perform the relay service without the relay UE or does not perform the relay service on a constrained target, which can avoid failure of transmission of the relay service on the remote UE.

Implementation 2

At S303, the relay UE transmits a third message to the remote UE, where the third message contains the information of the BO timer and/or an ID of a target associated with the BO timer, or the relay UE releases connection with the remote UE, where the remote UE is a UE that establishes connection with the relay UE.

It can be understood that, implementation 2 can be implemented separately from implementation 1 or implemented together with implementation 1, which will not be limited herein.

For example, the operations at S302 and the operations at S303 each can be performed after the operations at S301, but an order of the operations at S302 and the operations at S303 is not limited.

In some situations, the second message and the third message can be the same message, e.g., a message for device discovering.

Optionally, in some implementations, the third message is any message or signaling for interaction between UEs, e.g., PC5 signaling, or a message for device discovering, e.g., an announcement message for discovering or a response message for discovering.

In some scenarios, if the remote UE and the relay UE perform the relay service by using the target, the target is not under congestion control. Therefore, in some implementations, the remote UE can be a remote UE that establishes connection with the relay UE but does not use the target.

In some implementations, the relay UE can release the connection with the remote UE on condition that the relay UE receives the information of the BO timer configured by the network device, facilitating to avoid failure of relay transmission on the remote UE connected with the relay UE.

For example, as illustrated in FIG. 6, in operations at S306, the relay UE transmits a fourth message to the remote UE, where the fourth message is used to request for releasing the connection with the remote UE and contains a release cause, and the release cause for example may include network congestion or an unreached time interval for initiating a retransmission process.

In some implementations, the fourth message may be any message or signaling for interaction between UEs, e.g., a connection release request.

In other implementations, the relay UE can transmit the information of the BO timer and/or the ID of the target associated with the BO timer to the remote UE on condition that the relay UE receives the information of the BO timer configured by the network device.

Furthermore, in operations at S304, the remote UE determines whether to use the relay UE to perform the relay service, according to the information of the BO timer and/or the ID of the target.

As an example, the remote UE can select to wait for the relay UE according to the information of the BO timer, and then perform the relay service through the relay UE in response to expiration of the BO timer.

As another example, the remote UE can select not to wait for the relay UE, and give priority to access another relay UE, in this case, the remote UE can reserve the connection with the relay UE or release connection with the relay UE. For example, as illustrated in FIG. 6, in operations at S305, the remote UE can transmit a fifth message to the relay UE, where the fifth message is used to request for releasing the connection with the relay UE and contains a release cause, and the release cause includes network congestion or an unreached time interval for initiating a retransmission process.

Optionally, in some implementations, the ID of the target includes at least one of: a DNN, S-NSSAI, or a relay service code.

As for specific implementation, reference can be made to implementation 1, which will not be repeated herein for the sake of simplicity.

Therefore, in the method for relay transmission in implementations of the disclosure, in the case where the relay UE receives the information of the BO timer of the network, the relay UE can inform the remote UE of the information, facilitating to avoid failure of data transmission caused by that the remote UE does not know that the relay service on the relay UE is constrained. Alternatively, the relay UE also can select to release the connection with the remote UE, such that the remote UE cannot perform the relay service through the relay UE and also can avoid failure of transmission of the relay service on the remote UE.

Figure 7:
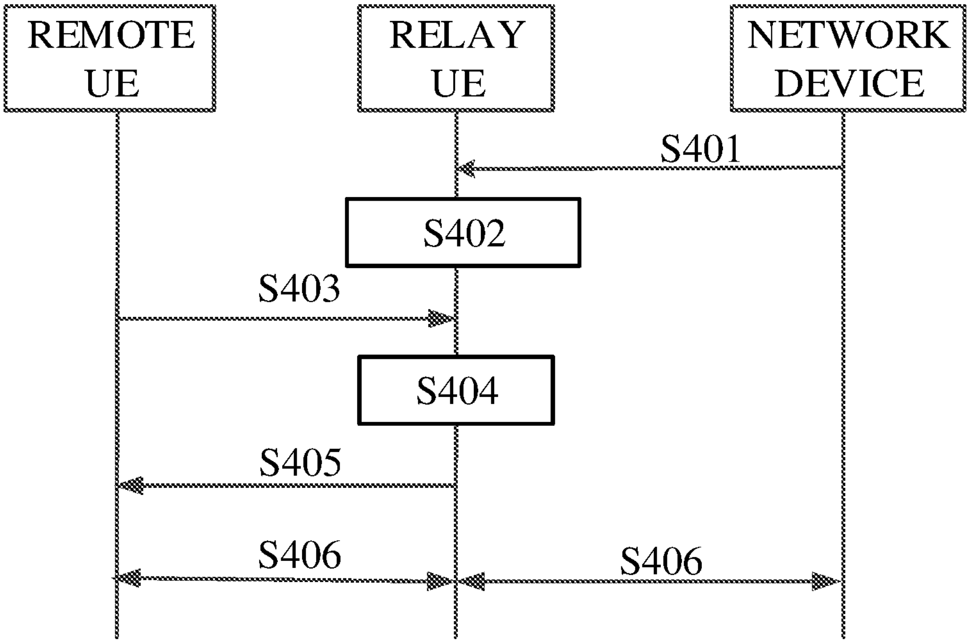
FIG. 7 is a schematic flow chart illustrating another method for relay transmission provided in implementations of the disclosure.

FIG. 7 is a schematic interactive diagram illustrating a method 400 for relay transmission according to another implementation of the disclosure. As illustrated in FIG. 7, the method 400 may include but is not limited to the following.

At S401, a relay UE receives a first message transmitted by a network device, where the first message contains information of a BO timer, a duration of the BO timer is shorter than a first duration, the first duration is a wait duration of a remote UE connected with the relay UE after the remote UE transmits signaling to the relay UE, and the remote UE determines failure of transmission of the signaling on condition that the remote UE receives no response message for the signaling within the first duration.

At S406, the relay UE performs a relay service on the remote UE in response to expiration of the BO timer.

In implementations of the disclosure, if the relay UE receives the information of the BO timer of the network device, the relay UE determines that the relay service on the relay UE is constrained within the duration of the BO timer. Optionally, the relay service on the relay UE being constrained may include that the relay UE cannot perform the relay service during running of the BO timer, and/or the relay UE cannot perform a relay service on a specific target during running of the BO timer.

In some implementations, the BO timer may be a BO timer in a congestion control scenario.

The congestion control scenario may be any congestion control scenario in the foregoing implementations, e.g., the congestion control scenario at the core network or the congestion control scenario at the AN, where the congestion control scenario at the core network for example may include NAS level mobility management congestion control, DNN based congestion control, S-NSSAI based congestion control, or the like.

In other implementations, the BO timer also may be used to normalize a time interval every which the relay UE initiates a retransmission process, i.e., the relay UE is restrained from initiating frequently the same process within an extremely short time interval. In a sense, the relay UE being restrained from initiating frequently the same process may be to avoid network congestion. The BO timer being used in the congestion control scenario is taken as an example for illustration below, which will not be limited herein.

It can be understood that, the UE-to-network relay architecture is not specifically limited in implementations of the disclosure, e.g., the UE-to-network relay architecture may be the L3 architecture or the L2 architecture in the foregoing implementations.

Optionally, the first message may be any DL message, e.g., the information of the BO timer can be carried through an existing message or a new message.

In some implementations, the network device is a core network device, and the first message includes one of: a registration reject message, a service reject message, a deregistration message, DL NAS transport, or a session management reject message.

In other implementations, the network device is an AN device, and the first message is an RRC message.

In the implementation, after the remote UE transmits the signaling to the relay UE, the remote UE determines failure of transmission of the signaling when the first duration elapses, and thus by configuring the duration of the BO timer to be shorter than the first duration by the network device, the relay UE can perform the relay service on the remote UE in response to expiration of the BO timer, thereby ensuring transmission of the relay service on the remote UE.

For example, as illustrated in FIG. 7, the relay UE buffers an untransmitted relay service on condition that the relay UE has the untransmitted relay service, in response to starting of the BO timer. Furthermore, in the operations at S406, the relay UE transmits the untransmitted relay service in response to expiration of the BO timer.

In some implementations, as illustrated in FIG. 7, in the operations at S403, the relay UE receives a sixth message transmitted by the remote UE during running of the BO timer, where the sixth message contains a parameter of a service to-be-transmitted and/or a service to-be-transmitted, e.g., a target internet protocol (IP) address, a port number, an application ID, or the like. Optionally, the sixth message may be a connection update request.

Furthermore, in the operations at S404, the relay UE buffers the parameter of the service to-be-transmitted and/or the service to-be-transmitted on condition that the relay UE determines, according to the parameter of the service to-be-transmitted, that a first PDU session is required to be established.

In operations at S405, the first PDU session is established according to the parameter of the service to-be-transmitted in response to expiration of the BO timer.

In some implementations, the relay UE transmits a seventh message to the remote UE in response to failure of transmission of the service to-be-transmitted or failure of establishment of the first PDU session, where the seventh message is used to inform the remote UE of failure of transmission of the service to-be-transmitted or failure of establishment of the first PDU session.

In some implementations, in order to avoid a condition that the remote UE determines failure of connection updating before expiration of the BO timer, the duration of the BO timer can be set to be shorter than a duration that the remote UE waits for a response message after the remote UE transmits the sixth message. That is, the first duration may be a wait duration of the remote UE determining failure of transmission of the signaling after the remote UE transmits the sixth message.

Optionally, in the implementation, after receiving the first message, the remote UE also can perform operations at S402: during running of the BO timer, the relay UE is restrained from transmitting a message used for device discovering, or transmits a second message, where the second message is used to indicate that a relay service on the relay UE is constrained or the relay UE cannot be used as a relay.

For specific implementation of the operations at S402, reference can be made to specific implementation of the operations at S302, which will not be repeated herein for the sake of simplicity.

Therefore, in the method for relay transmission in implementations of the disclosure, the network device configures the duration of the BO timer to be shorter than the wait duration of the remote UE, so that the relay UE can perform the relay service on the remote UE in response to expiration of the BO timer, which can avoid failure of transmission of the relay service.

In conjunction with FIG. 3 to FIG. 7 above, the method implementations of the disclosure are illustrated in details. The following will illustrate apparatus implementations of the disclosure in details in conjunction with FIG. 8 to FIG. 13. It can be understood that, the apparatus implementations correspond to the method implementations, and for similar illustration, reference can be made to the method implementations.

Figure 8:
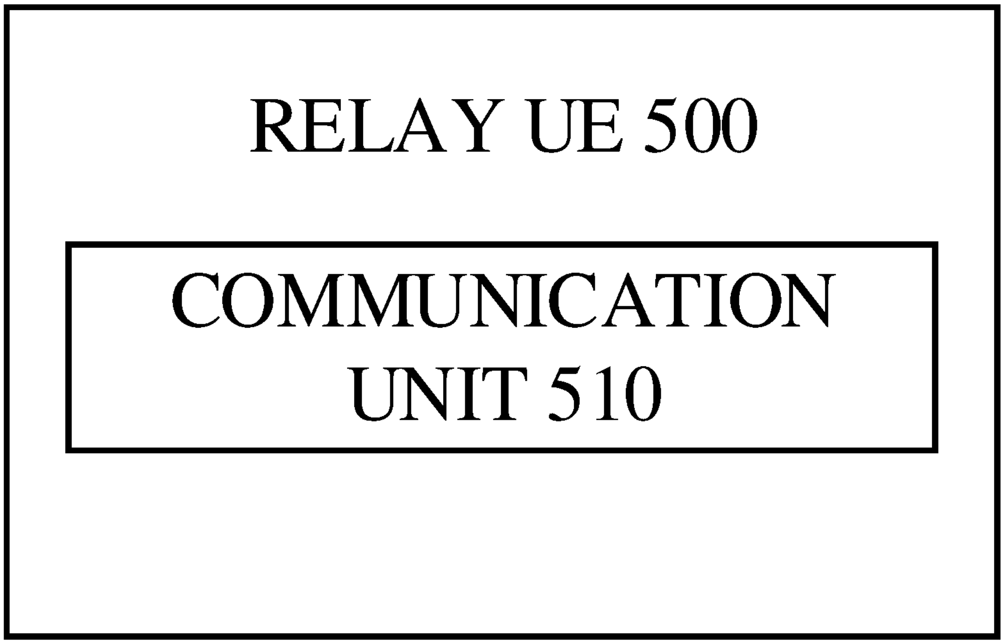
FIG. 8 is a schematic block diagram illustrating a relay user equipment (UE) provided in implementations of the disclosure.

FIG. 8 is a schematic block diagram illustrating a relay UE 500 according to implementations of the disclosure. As illustrated in FIG. 8, the relay UE 500 is a relay UE and includes a communication unit 510. The communication unit 510 is configured to receive a first message transmitted by a network device, where the first message contains information of a BO timer. The communication unit 510 is further configured to restrain from transmitting a message used for device discovering or transmit a second message, during running of the BO timer, where the second message is used to indicate that a relay service on the relay UE is constrained or the relay UE cannot be used as a relay.

Optionally, in some implementations, the second message contains no ID of a target associated with the BO timer, contains the information of the BO timer and the ID of the target associated with the BO timer, or contains no parameter for relay transmission.

Optionally, in some implementations, the communication unit 510 is further configured to transmit the second message that contains no parameter for relay transmission on condition that the relay UE is further used for non-relay service transmission between UEs.

Optionally, in some implementations, the communication unit 510 is further configured to restrain from responding to a message for searching the relay UE transmitted by a remote UE.

Optionally, in some implementations, the communication unit 510 is further configured to restrain from responding to a message that is transmitted by a remote UE and used to search a relay UE supporting the target associated with the BO timer.

Optionally, in some implementations, the ID of the target includes at least one of: a DNN, S-NSSAI, or a relay service code.

Optionally, in some implementations, the network device is an AN device, and the communication unit 510 is further configured to receive at an RRC layer of the relay UE the first message transmitted by an RRC layer of the AN device.

Optionally, in some implementations, the relay UE further includes a processing unit. The processing unit is configured to transmit at the RRC layer the information of the BO timer to a specific layer of the relay UE.

Optionally, in some implementations, the specific layer is an NAS or a ProSe layer.

Optionally, in some implementations, the network device is a core network device, and the first message includes one of: a registration reject message, a service reject message, a deregistration message, DL NAS transport, a session establishment reject message, or a session modification reject message.

Optionally, in some implementations, the network device is an AN device, and the first message is an RRC message.

Optionally, in some implementations, the second message is an announcement message for discovering or a response message for discovering.

Optionally, in some implementations, the BO timer is used for congestion control or used to normalize a time interval every which the relay UE initiates a retransmission process.

Optionally, in some implementations, the communication unit may be a communication interface or a transceiver, or an input-output interface on a communication chip or a system on chip (SoC). The processing unit above may be one or more processors.

It can be understood that, according to implementations of the disclosure, the relay UE 500 can correspond to the relay UE in method implementation 1 of the disclosure, and the above-mentioned and other operations and/or functions of each unit in the relay UE 500 respectively implement a corresponding process performed by the relay UE in the method 300 as illustrated in FIG. 6, which will not be repeated herein for the sake of simplicity.

Figure 9:
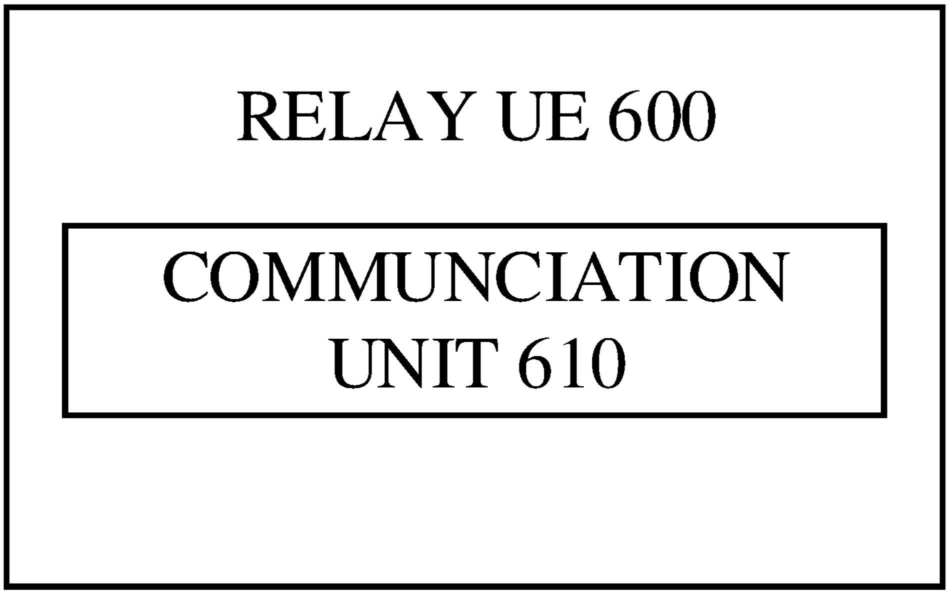
FIG. 9 is a schematic block diagram illustrating another relay UE provided in implementations of the disclosure.

FIG. 9 is a schematic block diagram illustrating a relay UE 600 according to implementations of the disclosure. As illustrated in FIG. 9, the relay UE 600 includes a communication unit 610. The communication unit 610 is configured to receive a first message transmitted by a network device, where the first message contains information of a BO timer. The communication unit 610 is configured to transmit a third message to a remote UE, where the third message contains the information of the BO timer and/or an ID of a target associated with the BO timer, or the relay UE releases connection with the remote UE, where the remote UE is a UE that establishes connection with the relay UE.

Optionally, in some implementations, the remote UE is a remote UE that establishes connection with the relay UE but does not use the target.

Optionally, in some implementations, the ID of the target includes at least one of: a DNN, S-NSSAI, or a relay service code.

Optionally, in some implementations, the communication unit 610 is further configured to transmit a fourth message to the remote UE, where the fourth message is used to request for releasing the connection with the remote UE and contains a release cause, and the release cause includes network congestion or an unreached time interval for initiating a retransmission process.

Optionally, in some implementations, the network device is a core network device, and the first message includes one of: a registration reject message, a service reject message, a deregistration message, DL NAS transport, a session establishment reject message, or a session modification reject message.

Optionally, in some implementations, the network device is an AN device, and the first message is an RRC message.

Optionally, in some implementations, the third message is PC5 signaling.

Optionally, in some implementations, the BO timer is used for congestion control or used to normalize the time interval every which the relay UE initiates the retransmission process.

Optionally, in some implementations, the communication unit may be a communication interface or a transceiver, or an input-output interface on a communication chip or a SoC. The processing unit above may be one or more processors.

It can be understood that, according to implementations of the disclosure, the relay UE 600 can correspond to the relay UE in method implementation 2 of the disclosure, and the above-mentioned and other operations and/or functions of each unit in the relay UE 600 respectively implement a corresponding process performed by the relay UE in the method 300 as illustrated in FIG. 6, which will not be repeated herein for the sake of simplicity.

Figure 10:
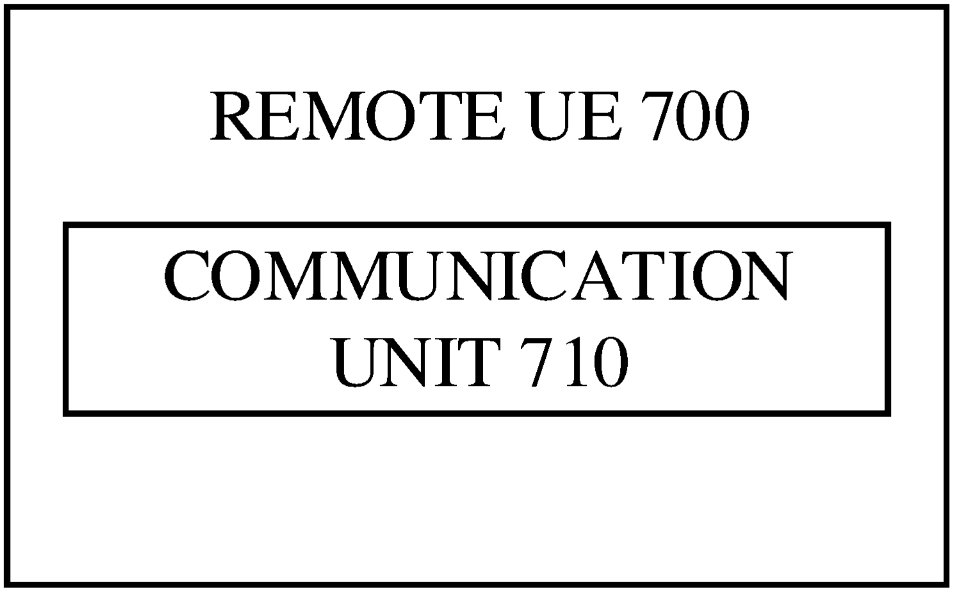
FIG. 10 is a schematic block diagram illustrating a remote UE provided in implementations of the disclosure.

FIG. 10 is a schematic block diagram illustrating a remote UE 700 according to implementations of the disclosure. As illustrated in FIG. 10, the remote UE 700 includes a communication unit 710. The communication unit 710 is configured to receive information of a BO timer and/or an ID of a target associated with the BO timer transmitted by a relay UE.

Optionally, in some implementations, the remote UE 700 further includes a processing unit. The processing unit is configured to determine whether to wait for the relay UE to perform a relay service according to the information of the BO timer and/or the ID of the target, or release connection between the remote UE and the relay UE.

Optionally, in some implementations, the processing unit is further configured to release the connection between the remote UE and the relay UE upon determining not to wait for the relay UE to perform the relay service.

Optionally, in some implementations, the communication unit 710 is further configured to transmit a fifth message to the relay UE, where the fifth message is used to request for releasing the connection with the relay UE and contains a release cause, and the release cause includes network congestion or an unreached time interval for initiating a retransmission process.

Optionally, in some implementations, the ID of the target includes at least one of: a DNN, S-NSSAI, or a relay service code.

Optionally, in some implementations, the remote UE is a remote UE that establishes connection with the relay UE but does not use the target.

Optionally, in some implementations, the information of the BO timer and/or the ID of the target associated with the BO timer are carried in at least one of: an announcement message for discovering, a response message for discovering, or a connection release message.

Optionally, in some implementations, the BO timer is used for congestion control or used to normalize the time interval every which the relay UE initiates the retransmission process.

Optionally, in some implementations, the communication unit may be a communication interface or a transceiver, or an input-output interface on a communication chip or a SoC. The processing unit above may be one or more processors.

It can be understood that, according to implementations of the disclosure, the remote UE 700 can correspond to the remote UE in the method implementations of the disclosure, and the above-mentioned and other operations and/or functions of each unit in the remote UE 700 respectively implement a corresponding process performed by the remote UE in the method implementations as illustrated in FIG. 6 and FIG. 7, which will not be repeated herein for the sake of simplicity.

Figure 11:
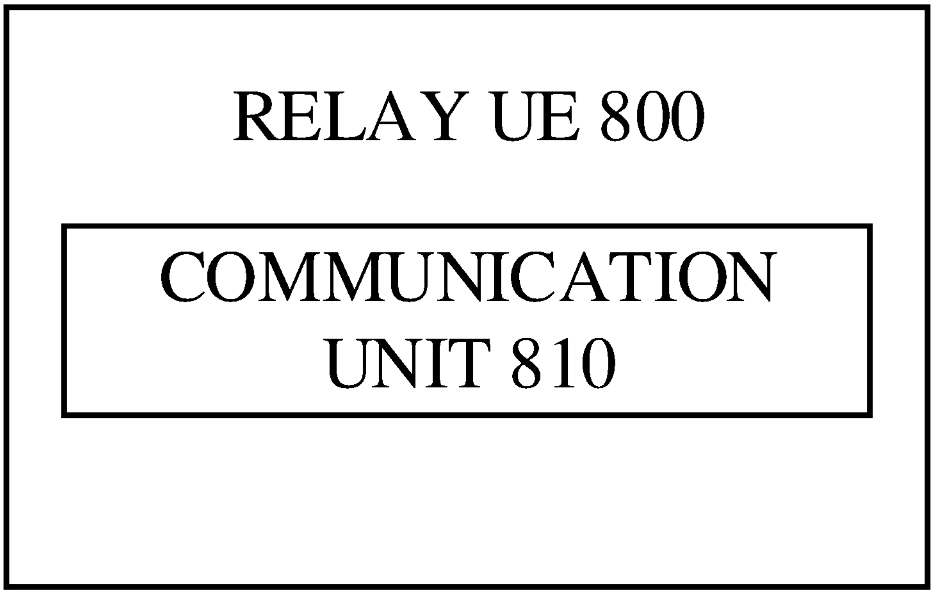
FIG. 11 is a schematic block diagram illustrating a yet another relay UE provided in implementations of the disclosure.

FIG. 11 is a schematic block diagram illustrating a relay UE 800 according to implementations of the disclosure. As illustrated in FIG. 11, the relay UE 800 includes a communication unit 810. The communication unit 810 is configured to receive a first message transmitted by a network device, where the first message contains information of a BO timer, a duration of the BO timer is shorter than a first duration, the first duration is a wait duration of a remote UE connected with the relay UE after the remote UE transmits signaling to the relay UE, and the remote UE determines failure of transmission of the signaling on condition that the remote UE receives no response message for the signaling within the first duration. The communication unit 810 is configured to perform a relay service on the remote UE in response to expiration of the BO timer.

Optionally, in some implementations, the relay UE 800 further includes a processing unit. The processing unit is configured to buffer an untransmitted relay service on condition that the relay UE has the untransmitted relay service, in response to starting of the BO timer. The communication unit 810 is further configured to transmit the untransmitted relay service in response to expiration of the BO timer.

Optionally, in some implementations, the communication unit 810 is further configured to receive a sixth message transmitted by the remote UE during running of the BO timer, where the sixth message contains a parameter of a service to-be-transmitted.

Optionally, in some implementations, the relay UE 800 further includes a processing unit. The processing unit is configured to buffer the parameter of the service to-be-transmitted on condition that the relay UE determines that a first PDU session is required to be established according to the parameter of the service to-be-transmitted. The communication unit 810 is further configured to establish the first PDU session according to the parameter of the service to-be-transmitted in response to expiration of the BO timer.

Optionally, in some implementations, the communication unit 810 is further configured to transmit a seventh message to the remote UE in response to failure of transmission of the service to be transmitted or failure of establishment of the first PDU session, where the seventh message is used to inform the remote UE of failure of transmission of the service to be transmitted or failure of establishment of the first PDU session.

Optionally, the first duration is a duration that the remote UE waits for a response message after the remote UE transmits the sixth message.

Optionally, the first message is an NAS message or an RRC message.

Optionally, in some implementations, the BO timer is used for congestion control or used to normalize a time interval every which the relay UE initiates a retransmission process.

Optionally, in some implementations, the communication unit may be a communication interface or a transceiver, or an input-output interface on a communication chip or a SoC. The processing unit above may be one or more processors.

It can be understood that, according to implementations of the disclosure, the relay UE 800 can correspond to the relay UE in the method implementations as illustrated in FIG. 7, and the above-mentioned and other operations and/or functions of each unit in the relay UE 800 respectively implement a corresponding process performed by the relay UE in the method 400 as illustrated in FIG. 7, which will not be repeated herein for the sake of simplicity.

Figure 12:
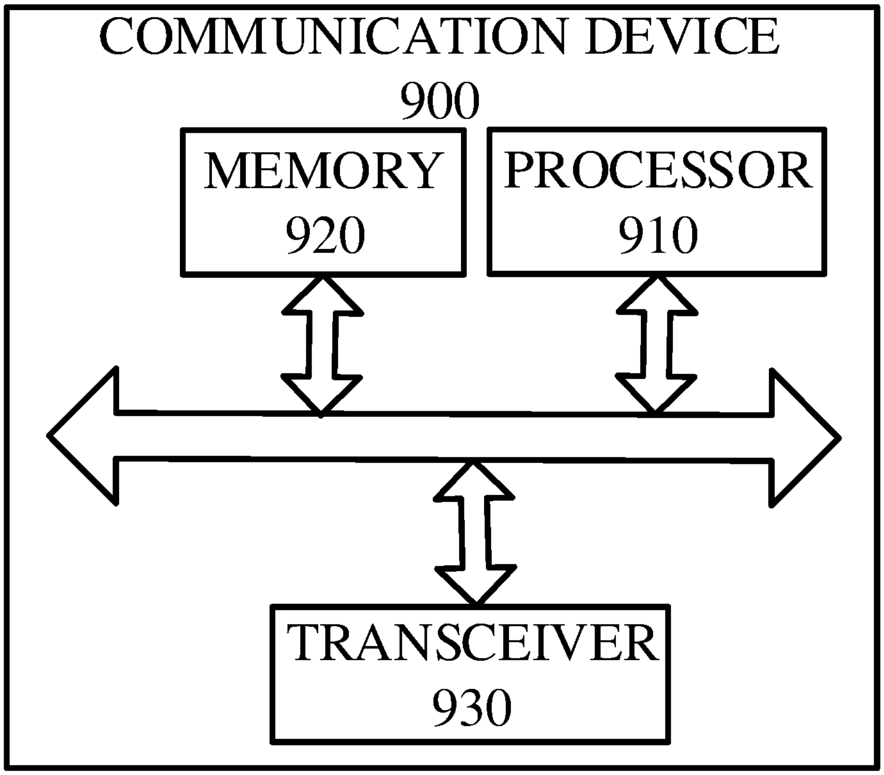
FIG. 12 is a schematic block diagram illustrating a communication device provided in implementations of the disclosure.

FIG. 12 is a schematic structural diagram illustrating a communication device 900 according to implementations of the disclosure. The communication device 900 illustrated in FIG. 12 includes a processor 910. The processor 910 is configured to invoke and execute computer programs stored in a memory, to perform the methods in the implementations of the disclosure.

Optionally, as illustrated in FIG. 12, the communication device 900 further includes a memory 920. The processor 910 is configured to invoke and execute computer programs stored in the memory 920, to perform the methods in the implementations of the disclosure.

The memory 920 may be a separate device from the processor 910, or be integrated into the processor 910.

Optionally, as illustrated in FIG. 12, the communication device 900 further includes a transceiver 930. The processor 910 can control the transceiver 930 to communicate with other devices. For example, the transceiver 930 can transmit information or data to other devices, or receive information or data transmitted by other devices.

The transceiver 930 may include a transmitter and a receiver, and further include one or more antennas.

Optionally, the communication device 900 may be the relay UE in the implementations of the disclosure, and the communication device 900 can implement a corresponding process implemented by the relay UE in each of the methods of the implementations of the disclosure, which will not be repeated herein for the sake of simplicity.

Optionally, the communication device 900 may be the remote UE in the implementations of the disclosure, and the communication device 900 can implement a corresponding process implemented by the remote UE in each of the methods of the implementations of the disclosure, which will not be repeated herein for the sake of simplicity.

Optionally, the communication device 900 may be the network device in the implementations of the disclosure, and the communication device 900 can implement a corresponding process implemented by the network device in each of the methods of the implementations of the disclosure, which will not be repeated herein for the sake of simplicity.

Figure 13:
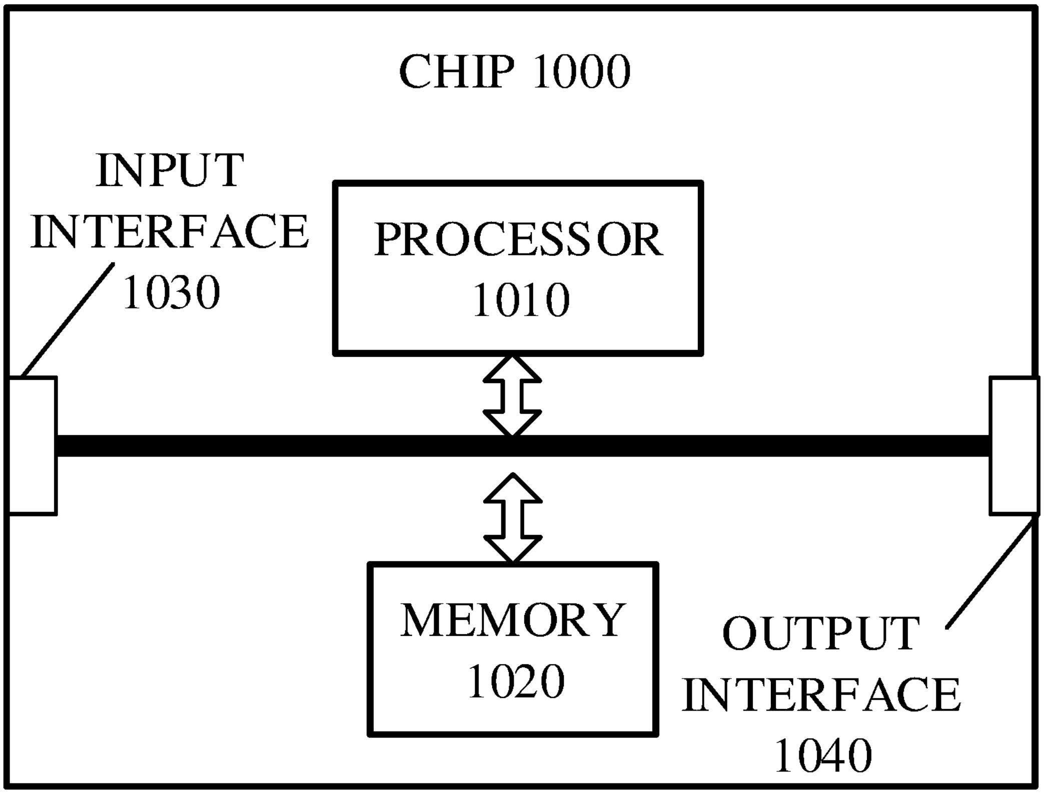
FIG. 13 is a schematic block diagram illustrating a chip provided in implementations of the disclosure.

FIG. 13 is a schematic structural diagram illustrating an apparatus in implementations of the disclosure. The chip 1000 illustrated in FIG. 13 includes a processor 1010. The processor 1010 is configured to invoke and execute computer programs stored in a memory, to perform the methods in the implementations of the disclosure.

Optionally, as illustrated in FIG. 13, the chip 1000 further includes a memory 1020. The processor 1010 is configured to invoke and execute computer programs stored in the memory 1020, to perform the methods in the implementations of the disclosure.

The memory 1020 may be a separate device from the processor 1010, or be integrated into the processor 1010.

In an example, the chip 1000 may further include an input interface 1030. The processor 1010 can control the input interface 1030 to communicate with other devices or chips. For example, the input interface 1030 can obtain information or data transmitted by other devices or chips.

Optionally, the chip 1000 may further include an output interface 1040. The processor 1010 can control the output interface 1040 to communicate with other devices or chips. For example, the output interface 1040 can output information or data to other devices or chips.

Optionally, the chip can be applied to the relay UE in the implementations of the disclosure, and the chip can implement a corresponding process implemented by the relay UE in each of the methods in the implementations of the disclosure, which will not be repeated herein for the sake of simplicity.

Optionally, the chip can be applied to the remote UE in the implementations of the disclosure, and the chip can implement a corresponding process implemented by the remote UE in each of the methods in the implementations of the disclosure, which will not be repeated herein for the sake of simplicity.

Optionally, the chip can be applied to the network device in the implementations of the disclosure, and the chip can implement a corresponding process implemented by the network device in each of the methods in the implementations of the disclosure, which will not be repeated herein for the sake of simplicity.

Optionally, the chip mentioned in implementations of the disclosure may be a system-level chip, a system chip, a chip system, a system-on-a-chip chip, or the like.

Figure 14:
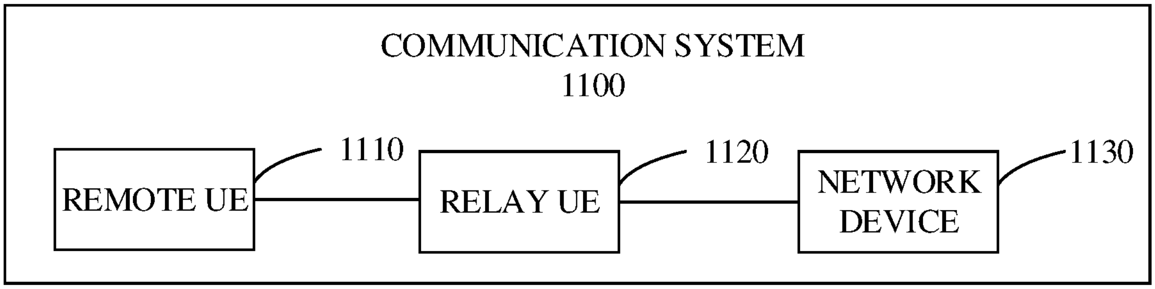
FIG. 14 is a schematic block diagram illustrating a communication system provided in implementations of the disclosure.

FIG. 14 is a schematic block diagram illustrating a communication system 1100 provided in implementations of the disclosure. As illustrated in FIG. 14, the communication system 1100 includes a remote UE 1110, a relay UE 1120, and a network device 1130.

The remote UE 1110 can be configured to implement a corresponding function implemented by the remote UE in the above methods, and the relay UE 1120 can be configured to implement a corresponding process implemented by the relay UE in the above methods, which will not be repeated herein for the sake of simplicity.

It can be understood that, the processor in the implementations of the disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the disclosure can be implemented or executed. The general purpose processor may be a microprocessor, or the processor may be any conventional processor or the like.

The steps of the method disclosed in the implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM) or an electrically erasable programmable memory, registers, and the like. The storage medium is located in the memory. The processor reads the information in the memory, and completes the steps of the above-mentioned method with the hardware thereof.

It can be understood that, in implementations of the disclosure, the memory may be a volatile memory or a non-volatile memory, or may include both the volatile memory and the non-volatile memory. The non-volatile memory may be a ROM, a PROM, an erasable programmable read-only memory (EPROM), an electrically erasable programmable read-only memory (EEPROM), or a flash memory. The volatile memory can be a RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM).

It can be understood that, the above-mentioned memory is an example but not limitation. For example, the memory may be an SRAM, a DRAM, an SDRAM, a DDRSDRAM, an ESDRAM, an SLDRAM, and a DRRAM. That is to say, the memory described herein is intended to include, but is not limited to, these and any other suitable types of memory.

A computer-readable storage medium is further provided in implementations of the disclosure. The computer-readable storage medium is configured to store computer programs.

Optionally, the computer-readable storage medium may be applied to the relay UE in implementations of the disclosure, and the computer programs enable a computer to perform a corresponding process implemented by the relay UE in each of the methods in implementations of the disclosure, which will not be repeated herein for the sake of simplicity.

Optionally, the computer-readable storage medium may be applied to the remote UE in implementations of the disclosure, and the computer programs enable a computer to perform a corresponding process implemented by the remote UE in each of methods in implementations of the disclosure, which will not be repeated herein for the sake of simplicity.

A computer program product is further provided in implementations of the disclosure. The computer program product includes computer program instructions.

Optionally, the computer program product may be applied to the relay UE in implementations of the disclosure, and the computer programs enable a computer to perform a corresponding process implemented by the relay UE in each of the methods in implementations of the disclosure, which will not be repeated herein for the sake of simplicity.

Optionally, the computer program product may be applied to the remote UE in implementations of the disclosure, and the computer programs enable a computer to perform a corresponding process implemented by the remote UE in each of methods in implementations of the disclosure, which will not be repeated herein for the sake of simplicity.

A computer program is further provided in implementations of the disclosure.

Optionally, the computer program may be applied to the relay UE in implementations of the disclosure, and the computer program, when running on a computer, enables the computer to perform a corresponding process implemented by the relay UE in each of the methods in implementations of the disclosure, which will not be repeated herein for the sake of simplicity.

Optionally, the computer program may be applied to the remote UE in implementations of the disclosure, and the computer program, when running on a computer, enables the computer to perform a corresponding process implemented by the remote UE in each of the methods in implementations of the disclosure, which will not be repeated herein for the sake of simplicity.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the disclosure.

Various functional units described in the implementations herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the disclosure. The above-mentioned storage medium may include various kinds of medium that can store program codes, such as a universal serial bus (USB) flash disk, a mobile hard drive, a ROM, a RAM, a magnetic disk, or an optical disk.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for relay transmission, the method being applied to a relay user equipment (UE) and comprising:

receiving a first message transmitted by a network device, the first message comprising a deregistration message, the first message containing information of a back-off (BO) timer, and the BO timer being used for congestion control; and during running of the BO timer, restraining from performing a relay service for a remote UE;

wherein during running of the BO timer, restraining from performing the relay service for the remote UE comprises:

restraining from actively transmitting a message used for device discovering.

2. The method of claim 1, wherein restraining from performing the relay service for the remote UE comprises:

restraining from responding to a message for searching the relay UE transmitted by the remote UE.

3. The method of claim 1, further comprising:

transmitting a third message to a remote UE, the third message containing the information of the BO timer.

4. The method of claim 3, wherein the third message is PC5 signaling.

5. The method of claim 1, further comprising:

releasing connection with the remote UE according to the information of the BO timer.

6. The method of claim 1, wherein the BO timer is used for congestion control.

7. The method of claim 1, further comprising:

transmitting a second message to the remote UE, wherein the second message indicates that a relay service on the relay UE is constrained or the relay UE cannot be used as a relay.

8. The method of claim 7, wherein the second message contains the information of the BO timer and an identifier (ID) of a target associated with the BO timer.

9. The method of claim 8, wherein the ID of the target comprises at least one of: a data network name (DNN), single-network slice selection assistance information (S-NSSAI), or a relay service code.

10. The method of claim 1, further comprising:

releasing connection with the remote UE, wherein the remote UE is a UE that has established connection with the relay UE.

11. The method of claim 10, wherein releasing the connection with the remote UE comprises:

transmitting a fourth message to the remote UE, wherein the fourth message is used to request for releasing the connection with the remote UE and contains a release cause, and the release cause comprises network congestion.

12. A relay user equipment (UE), comprising:

a transceiver;

a memory storing a computer program; and a processor coupled with the transceiver and the memory;

the computer program being executed by the processor to cause the relay UE to:

receive a first message transmitted by a network device, the first message comprising a deregistration message, the first message containing information of a back-off (BO) timer, and the BO timer being used for congestion control; and restrain from performing a relay service for a remote UE, during running of the BO timer;

wherein the computer program causing the relay UE to restrain from performing the relay service for the remote UE causes the relay UE to restrain from actively transmitting a message used for device discovering.

13. The relay UE of claim 12, wherein the computer program causing the relay UE to restrain from performing the relay service for the remote UE further causes the relay UE to restrain from responding to a message for searching the relay UE transmitted by the remote UE.

14. The relay UE of claim 12, wherein the computer program is further executed by the processor to cause the relay UE to:

transmit a third message to a remote UE, wherein the third message contains the information of the BO timer.

15. The relay UE of claim 12, wherein the computer program is further executed by the processor to cause the relay UE to:

release connection with the remote UE according to the information of the BO timer.

16. The relay UE of claim 12, wherein the BO timer is used for congestion control.

17. The relay UE of claim 12, wherein the computer program is further executed by the processor to cause the relay UE to:

transmit a second message to the remote UE, wherein the second message indicates that a relay service on the relay UE is constrained or the relay UE cannot be used as a relay.

18. The relay UE of claim 17, wherein the second message contains the information of the BO timer and an identifier (ID) of a target associated with the BO timer.

19. The relay UE of claim 12, wherein the computer program is further executed by the processor to cause the relay UE to release connection with the remote UE, wherein the remote UE is a UE that has established connection with the relay UE.

20. The relay UE of claim 19, wherein the computer program causing the relay UE to release the connection with the remote UE causes the relay UE to:

transmit a fourth message to the remote UE, wherein the fourth message is used to request for releasing the connection with the remote UE and contains a release cause, and the release cause comprises network congestion.

* * * * *